United States Patent Office 3,002,972
Patented Oct. 3, 1961

3,002,972
18-OXYGENATED STEROIDS AND PROCESS FOR THEIR SYNTHESIS
Albert Wettstein and Karl Heusler, Basel, Hellmut Ueberwasser, Riehen, and Peter Wieland, Basel, Switzerland, assignors to Ciba Pharmaceutical Products Inc., Summit, N.J.
No Drawing. Filed Nov. 28, 1958, Ser. No. 776,693
Claims priority, application Switzerland Dec. 5, 1957
14 Claims. (Cl. 260—239.55)

Among the 18-oxygenated steroids aldosterone, the hormone isolated from suprarenal glands, is of outstanding importance owing to its specific action on mineral metabolism. As the quantities present in animal organs are insufficient for economic production of the hormone, and as it has not hitherto been possible to obtain aldosterone by partial synthesis from other naturally occurring steroids, a totally synthetic method is of great industrial importance.

The present invention provides a new process which enables aldosterone and its derivatives to be synthesized in a simple manner from a $\Delta^{4:18}$-3:16-dioxo-11$\beta$:18a-oxido-18a-methyl-18-homo-androstadiene of the formula

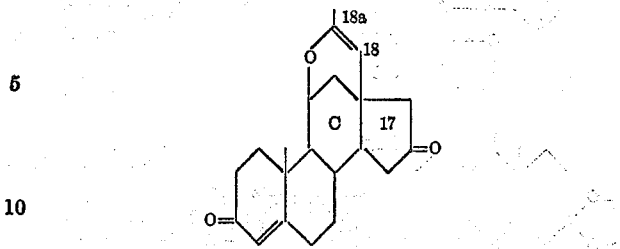

or a corresponding 3-ketal, which may contain in the 14:15-position a further double bond.

The new process can be split up into four main parts.
(A) Degradation of the cyclic enol-ether grouping at ring C to form the 18:11-cyclo-hemiacetal structure typical of aldosterone.
(B) Condensation in the 17-position with an oxalic acid ester and the production of derivatives to protect the 20-oxo group.
(C) Hydrogenation of the 14:15-double bond and elimination of the oxygen function in the 16-position.
(D) Conversion of the side chain into the ketol-side chain of aldosterone.

One form of the synthesis is represented by the following formulae

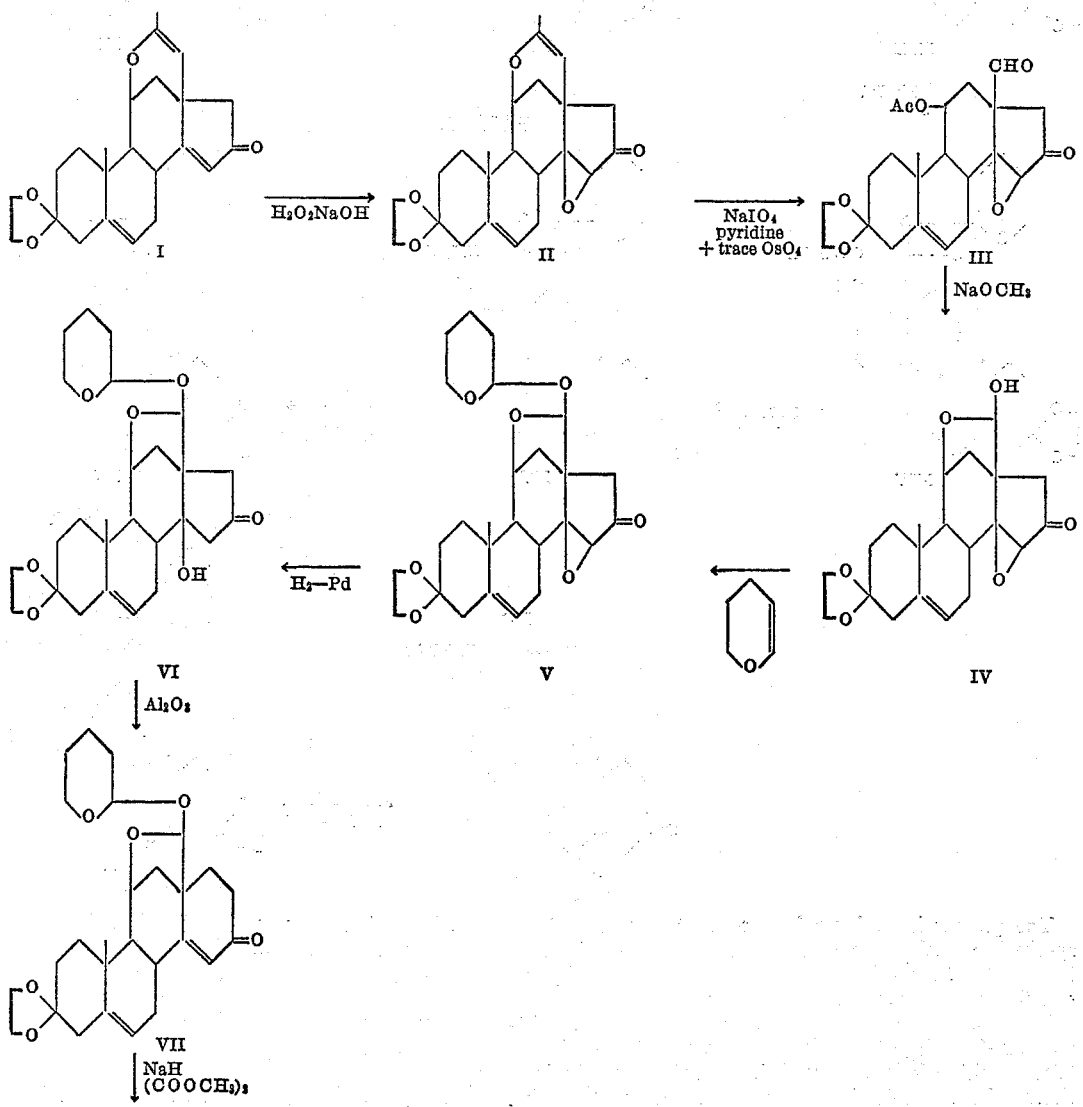

PART B

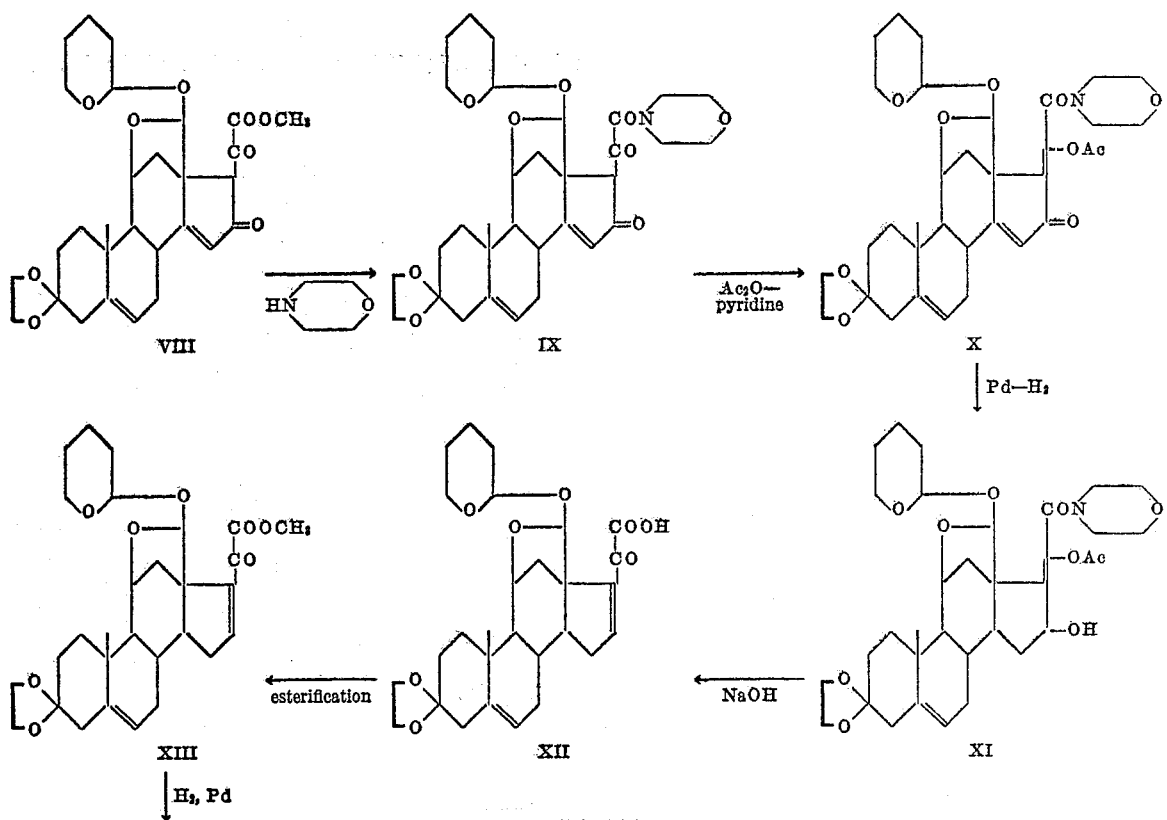

PART D

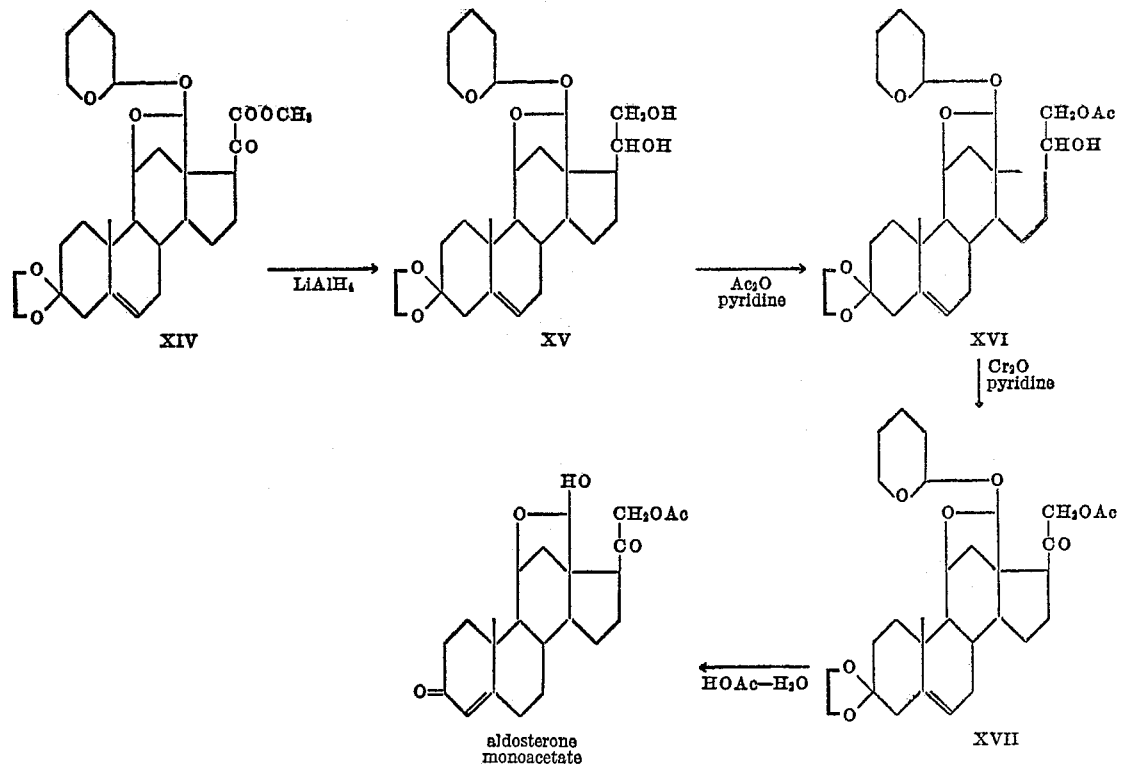

The present invention relates to Part D of the above synthesis, namely the conversion of 20-oxo-21-acid grouping into the 20-oxo-21-hydroxy-side chain and the hydrogenation of any 16:17-double bond present.

In the process of this invention a 20-oxo-pregnane-21-acid or -21-acid ester which may be unsaturated in the 16:17-position is reduced with lithium-aluminum hydride lithium borohydride (or other equivalent agent capable of transforming a carboxylic acid ester to the corresponding carbinol) to form the 20:21-dihydroxy-pregnane, the latter is converted by a method in itself known in to a 20-oxo-21-hydroxy-pregnane or a 21-ester thereof, and at any stage a 16:17-double bond is hydrogenated, and if desired, protected oxo groups in the 3-position or in the 3- and 18-positions are liberated, if desired, the type of compounds designated as XII, XIII and XIV of the flow sheet, may be hydrolyzed to remove the protective groups in the 3- and 18-positions, and then lactonized to the 18,21-lactone.

The reduction with lithium-aluminum hydride (or equivalent reducing agent) is carried out in an anhydrous medium, for example, in diethyl ether, dimethyl ether, methyl ethyl ether, tetrahydrofurane ethylene glycol dimethyl ether or dioxane or a mixture of these substances. There are advantageously used as starting materials esters of 20-oxo-21-acids as these are more easily obtained than the free acids in an anhydrous crystalline form.

The esterification of the 20-oxo-pregnene-21-acids, which may be saturated or unsaturated in the 16:17-position, is performed by methods as such known. When esterification is effected with diazomethane, the reaction is conducted for a very short time and at a low temperature in order to form the desired 16:17-saturated-20-oxo-pregnane-21-acid ester. Esterification is also possible when an alkali metal salt of the acid is treated with a lower alkyl halide, sulfate, phosphate, etc., such as dimethyl sulfate or methyl iodide. It is especially simple to esterify the acid in an anhydrous medium with a lower alkyl halide, such as methyl iodide, with or without a diluent, in the presence of an excess of anhydrous alkali metal salt of a weak acid, e.g. potassium carbonate. The reduction may also be carried out with the free 21-acids. By the reduction there is obtained a mixture of the 20:21-diols epimeric in the 20-position.

These diols may be converted in various ways into 20:21-ketols. An advantageous method consists in reacting the 20:21-diol with somewhat more than one molar equivalent of a reactive derivative of a carboxylic acid in the presence of an acid-binding agent (e.g. pyridine), by a method in itself known, and oxidizing the 20-hydroxyl group in the resulting 21-ester to a 20-oxo group. For the partial esterification in the 21-position there may be used reactive derivatives particularly anhydride and acid halides, of saturated or unsaturated aliphatic or cycloaliphatic, or aromatic, araliphatic or heterocyclic carboxylic acids, for example, reactive derivatives of formic acid, acetic acid, trifluoracetic acid, propionic acid, butyric acids, valeric acids, such as n-valeric acid or trimethylacetic acid, caproic acids such as β-trimethylpropionic acid, oenanthic acid, caprylic acid, pelargonic acid, capric acid, undecylic acids, for example, undecylenic acid, lauric acid, myristic acid, palmitic acid or stearic acids, for example, oleic acid, or cyclopentyl-, cyclohexyl- or phenyl-acetic acids or propionic acids, benzoic acid, hexahydrobenzoic acid, furane-2-carboxylic acid, nicotinic acids, and also dicarboxylic acids, such as oxalic acid, succinic acid or glutaric acids, or substituted carboxylic acids, such as β-keto-carboxylic acids, for example, acetoacetic acid, propionyl acetic acid, butyryl acetic acid or caprylacetic acid or amino-acids.

The oxidation of the 20-hydroxyl group to the 20-oxo group is advantageously carried out by oxidation with compounds of hexavalent chromium, especially with pyridine-chromic acid complex. When a 16:17 double bond is present the oxidation may be carried out with manganese dioxide. In this case previous protection of the 21-hydroxyl group by esterification is advantageous, although not absolutely necessary.

Alternatively, the 20:21-diols obtained by reduction with lithium-aluminum hydride may be degraded by glycol splitting, for example, with lead tetracetate, sodium bismuthate or with periodic acid, to form the 17-aldehyde, and the latter is oxidized to the corresponding etio-acid. For this purpose it is suitable for example, to carry out the oxidation with sodium bichromate or preferably with potassium permanganate in pyridine. The acid so obtained may be built up in known manner by way of its acid chloride and diazo-ketone to form the corresponding 21-acyloxy-20-ketone.

Hydrogenation of the 16:17-double bond may be carried out at any stage of the process, for example, before the reduction with lithium-aluminum hydride, at the stage of the 20:21-diol or its 21-monoester or at the stage of the 21-acyloxy-20-ketone. It takes place very easily especially when the double bond is conjugated to a 20-oxo-group. There is advantageously used a noble metal (e.g. palladium) catalyst on a support, for example, on calcium carbonate, barium sulfate, zinc carbonate, charcoal or the like, in an inert solvent such as methanol, ethanol, isopropanol, propanol, ethyl acetate, tetrahydrofurane, dioxane dimethylformamide, diethyl formamide, etc. In the case of compounds in which the 18-carbon atom is bound directly to the 11β-hydroxy-group, for example, in 18:11-cyclo-semiacetals and derivatives thereof or 18:11-lactone it is of advantage to carry out the hydrogenation only after the reduction with hydride, in order to reduce the risk of isomerization at the 17-carbon atom. Thus, in these compounds the "unnatural" 17α-position of the side chain is more stable than the 17β-configuration.

As starting materials there are used more especially 18-substituted Δ⁵-11β-hydroxy-20-oxo-pregnene-21-acids saturated or unsaturated in the 16:17-position and derivatives thereof, which contain in the 3-position a protected, especially ketalized, oxo group. There are suitable, for example, the ketals derived from 1:2- and 1:3 lower alkylene glycols, such as ethylene glycol, 1:2- and 1:3-propylene glycol, mercaptoethanol or dimercapto ethylene. The term lower alkylene glycol is intended to include those compounds having the glycol structure but having one or both hydroxyl groups replaced by a mercapto group.

Other oxo groups present in the starting materials, especially in the 18-position, must also be protected before the reduction with lithium-aluminum hydride. In the case of 11β-hydroxy-18-oxo-compounds, an ether of the corresponding 18:11-cyclo-semi-acetal, for example, the tetrahydropyranyl ether, is especially suitable. One can also use the benzyl, trityl or any other such ethers. The ketals and 18:11-cyclo-semi-acetal ethers can easily be subjected to hydrolytic splitting after the conversion of the side chain in accordance with the invention. In the case of the groups mentioned above this takes place under extraordinarily mild conditions. Thus, it suffices to heat the 3-ketal-18-O-tetrahydropyranyl ether for a few minutes in acetic acid of 50–90% strength at 80–100° C., in order to bring about splitting of the two protecting groups. Under these conditions even the extremely sensitive aldosterone, especially in the form of its 21-ester, remains unchanged, so that the process of this invention is also very suitable for making this hormone. The starting materials and their preparation are described in U.S. patent application Serial No. 776,692, filed concurrently herewith.

The invention also provides compounds of the formula

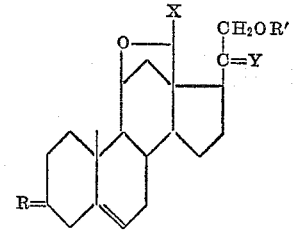

in which R represents a ketalized oxo group, R′ represents a hydrogen atom or an acyl group, X represents an etherified hydroxyl group especially a tetrahydropyranyl-oxy group, and Y represents the group

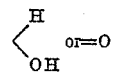

and also the corresponding substituted 17-formyl-compounds and etienic acids. These compounds are valuable intermediate products for the manufacture of aldosterone and its derivatives.

The compounds of this invention are racemates or optically active compounds. Racemates may be split up into their antipodes by methods in themselves known.

The invention also includes modifications of the process in which only a part of the process steps is carried out and these steps are carried out in any desired order of succession, or in which there is used as starting material an intermediate product obtainable at any stage of the process and the remaining process steps are carried out.

The following examples illustrate the invention:

Example 1

500 milligrams of d:l -$\Delta^{5:18}$-3-ethylene-dioxy-20-oxo-11$\beta$:18a - oxido - 18a - methyl - 18 - homo - 14$\beta$ - pregnadiene-21-acid methyl ester are added to 200 milligrams of lithium-aluminum hydride and 20 cc. of tetrahydrofuran in a current of nitrogen, while stirring and cooling with ice water, and the whole is stirred for one hour while cooling with ice and for ½ hour at room temperature. 2 cc. of ethyl acetate are then added while cooling with ice, and then a solution of Seignette salt is added. After extracting three times with chloroform, washing the chloroform solution with a dilute solution of Seignette salt, drying the solution and evaporating the solvent there are obtained 500 milligrams of an oil insoluble in ether. The oil is dissolved in 12 cc. of methanol and 1.85 cc. of pyridine, and 2 cc. of an 0.812 molar solution of periodic acid are added while stirring. 1½ hours later the whole is poured into a semi-saturated solution of sodium chloride and the mixture is extracted several times with benzene. The benzene solutions are washed with semi-saturated sodium chloride solution, dried and evaporated in vacuo, and the residue is recrystallized from ether. The resulting d:l-$\Delta^{5:18}$-3-ethylene-dioxy-18$\beta$:18a-oxido - 17 - formyl - 18a - methyl - 18 - homo - 14$\beta$-androstadiene melts unsharply at about 156–166° C., even after repeated recrystallization from a mixture of acetone, ether and petroleum ether. Its infra-red absorption spectrum (solvent=methylene chloride) exhibits, inter alia, the following characteristic bands: 3.7$\mu$+5.83$\mu$ (aldehyde), 5.92$\mu$ (dihydropyran) and 9.10$\mu$ (ketal).

To a solution of 150 milligrams of the aldehyde so obtained in 15 cc. of pyridine there is added at 0° C. a solution of 90 milligrams of potassium permanganate in 15 cc. of acetone, and the whole is allowed to stand at 0° C. for 4½ hours. After adding 5 cc. of a solution of sodium sulfite of 6% strength and Celit, then filtering the mixture through Celit and washing the filtrate with methanol, the filtrate is concentrated to a considerable extent by evaporation in vacuo at 50–55° C. 10 cc. of a 1 N-solution of caustic soda are then added and the mixture is extracted once with benzene and once with ether. The organic phases are washed twice with 10 cc. of 1 N-caustic soda solution and once with water, then the aqueous extracts are combined and acidified with 5 cc. of glacial acetic acid, saturated with sodium chloride, and extracted twice with benzene and once with ether. To the dried and united organic phases ethereal diazomethane is added at 0° C. 10 minutes later the excess of diazo methane is decomposed with glacial acetic acid, and the mixture is washed with a dilute solution of sodium hydrogen carbonate and water, and then the aqueous solutions are again extracted once with ether. The organic solutions are combined, dried and evaporated in vacuo, and the residue is dissolved in 0.5 cc. of benzene and filtered through 2 grams of aluminum oxide (activity II) with the use of 20 cc. of benzene for washing. The eluate obtained with a mixture of ether and petroleum ether and with methanol is evaporated, and the residue is recrystallized to yield d:l -$\Delta^{5:18}$-3-ethylene-dioxy-11$\beta$:18a-oxido-18a-methyl-18-homo-14$\beta$-etiadienic acid methyl ester melting at 139–141° C. Its infra-red absorption spectrum in methylene chloride shows bands at 5.8$\mu$ (ester), 5.97$\mu$ (dihydropyrane) and 9.12$\mu$ (ketal).

1 gram of the ester melting at 139–141° C. is heated with 7.5 cc. of glacial acetic acid and 5.85 cc. of water for 25 minutes at 100° C. The mixture is then evaporated in vacuo, the residue is dissolved in benzene, the benzene is evaporated, and a solution of the residue in 3 cc. of benzene is chromatographed over 12 grams of aluminum oxide (activity II). The benzene eluates contain d:l - $\Delta^{4:18}$ - 3 - oxo - 11$\beta$:18a - oxido - 18a - methyl - 18-homo-14$\beta$-etiadienic acid methyl ester, which melts at 144–144.5° C. after recrystallization from methanol. $\epsilon_{239m\mu}$=17880. Its infra-red absorption spectrum in methylene chloride exhibits bands at 5.77$\mu$ (methylester); 5.98$\mu$ (3-ketone+dihydropyrane) and 6.17$\mu$ ($\Delta^4$-double bond).

Example 2

167 milligrams of d:l-$\Delta^{5:16}$-3-ethylene-dioxy-11$\beta$:18-oxido - 18 - tetrahydropyranyloxy - 20 - oxo - pregnadiene-21-acid methyl ester are dissolved in 35 cc. of freshly distilled ethyl acetate, 85 milligrams of a palladium-calcium carbonate catalyst of 10% strength are added, and the whole is then stirred in an atmosphere of hydrogen until the absorption of gas can no longer be observed (about 1 hour). The catalyst is then filtered off with suction, washed with methylene chloride, and the filtrate is evaporated to dryness under a water jet vacuum. By crystallizing the residue from methylene chloride-ether 93 milligrams of pure d:l-$\Delta^5$-3-ethylene-dioxy-11$\beta$:18-oxido - 18 - tetrahydropyranyloxy - 20 - oxo - pregnene-21-acid methyl ester are obtained, which melts at 220–223° C., and exhibits in the infra-red absorption spectrum in methylene chloride bands at 5.70$\mu$ (ester) and 5.79$\mu$ (20-ketone).

A solution of 83 milligrams of d:l-$\Delta^5$-3-ethylene-dioxy-11$\beta$:18 - oxido - 18 - tetrahydropyranyloxy - 20 - oxo-pregnene-21-acid methyl ester in 5 cc. of tetrahydrofurane is added to 100 milligrams of lithium-aluminum hydride and 5 cc. of tetrahydrofurane in a weak current of nitrogen, while stirring and cooling with ice, and rinsed twice with 2 cc. of tetrahydrofuran. After stirring the whole for one hour at 10–20° C., it is cooled with ice water and 2 cc. of ethyl acetate and 3 cc. of benzene are slowly added and then 20 cc. of a semi-saturated solution of Seignette salt. The reaction mixture is extracted three times with chloroform, and then the chloroform solutions are washed once with a dilute solution of Seignette salt and once with a semi-saturated solution of sodium chloride. The chloroform solution is dried, evaporated in vacuo at 50° C., and dried for 20 minutes at 50° C. under a high vacuum. The crystalline residue so obtained is dissolved in 0.5 cc. of absolute chloroform and a solution of 0.019 cc. of acetic anhydride and 0.019 cc. of pyridine in 0.15 cc. of chloroform is added while stirring. After allowing the mixture to stand overnight in the dark it is evaporated at 0° C. in vacuo, benzene is added, the mixture is evaporated in vacuo, and then dried for 20 minutes at 20° C. in a high vacuum. The residue is dissolved in 3 cc. of absolute pyridine and added to a mixture of 100 milligrams of chromium trioxide and 3 cc. of absolute pyridine while stirring, and rinsed twice with 1 cc. of pyridine. 23 hours later the mixture is diluted with benzene washed 4 times with water, and the aqueous extract is extracted twice with benzene. The residue obtained by drying the benzene solutions and evaporating them in vacuo at 50° C. is dissolved in 1 cc. of benzene and filtered through 5 grams of silica gel, ethyl acetate being used for washing out. After evaporating the filtrate in vacuo there are obtained 78 milligrams of a slightly yellow oil.

The oil is dissolved in 3.0 cc. of glacial acetic acid in a small flask. The flask is immersed for 5 minutes in an oil bath heated at 100° C., then 0.3 cc. of water is added, and the mixture is maintained at 100° C. for 5 minutes. The whole is then poured into 30 cc. of ice water and extracted several times with methylene chloride. The methylene chloride extracts are washed with a dilute solution of sodium hydrogen carbonate and with water, dried, and evaporated under a water jet vacuum to yield 51 milligrams of an almost colorless oil.

In order to obtain the d:l-aldosterone-21-monoacetate the residue is chromatographed on 17 sheets of paper with the use of formaldehyde/benzene as solvent system. The blue tetrazolium positive zones having the same ultra-violet absorption and the same Rf-value as d:l-aldosterone-21-monoacetate are cut out and eluted with 100 cc. of tetrahydrofuran of 20% strength and 60 cc. of pure tetrahydrofuran. The eluates are evaporated in vacuo at 40° C. to about 50 cc., then extracted three times with methylene chloride, and the organic solutions are washed twice with water. The residue obtained by drying the methylene chloride solutions and evaporating them in vacuo at 40° C. is dissolved in a small amount of acetone. After the addition of 8 milligrams of iron-free Norit, the mixture is filtered and washed with acetone. The filtrate is strongly concentrated, and on the addition of a few drops of ether d:l-aldosterone-21-monoacetate crystallizes in the form of fine colorless prisms. Its infra-red spectrum is identical with that of natural aldosterone-21 monoacetate.

*Example 3*

A solution of 80 milligrams of d:l-Δ⁵-3-ethylene-dioxy-11β:18 - oxido-18-tetrahydropyranyloxy-20-oxo-pregnene-21-acid methyl ester in 2 cc. of tetrahydrofuran is added, while stirring and cooling with ice, in a weak current of nitrogen to 100 milligrams of lithium-aluminum hydride in 5 cc. of tetrahydrofuran, rinsing being carried out with 3 cc. of tetrahydrofurane. The ice-cooling means is then removed, and the whole is stirred for 45 minutes at room temperature, and there are added first 2 cc. of ethyl acetate and 3 cc. of benzene and after 30 minutes a solution of Seignette salt, while cooling with ice. After extracting three times with chloroform, the organic solutions are washed once with a solution of Seignette salt and once with a dilute solution of sodium chloride. The residue obtained by drying the organic solutions and evaporating them in vacuo is dissolved in 2.2 cc. of methanol and 0.35 cc. of pyridine, and 0.3 cc. of a 1-molar solution of periodic acid is added, while stirring and cooling with ice. The whole is then stirred for 1¾ hours at room temperature, filtered to remove precipitated crystals, and the latter are washed with methanol, water, methanol and ether. The 21 milligrams of d:l-Δ⁵-3-ethylene-dioxy-11β:18 - oxido - 18 - tetrahydro-pyranyloxy-17β-formyl-androstene so obtained melts at 175-176° C. with decomposition. The mother liquid is diluted with semi-saturated sodium chloride solution and extracted three times with benzene. The benzene solutions are washed with dilute sodium chloride solution, dried and evaporated in vacuo, and the residue is recrystallized from a mixture of methanol and ether to yield a further 16 milligrams of the aldehyde. When taken up in methylene chloride the product exhibits in the infra-red absorption spectrum the bands at 3.65μ and 5.82μ that are characteristic of aldehydes.

35 milligrams of the aldehyde so obtained are dissolved in 3.5 cc. of absolute pyridine, and a solution of 21 milligrams of potassium permanganate in 3.5 cc. of acetone is added while cooling with ice. After stirring the mixture for 5 hours at 0° C., it is filtered to remove precipitated crystals and pyrolusite, washed with acetone, and the filtrate is mixed with an aqueous solution of sodium bisulfite until all the potassium permanganate has been reduced to pyrolusite. Celit is then added, while stirring, and the mixture is filtered through Celit and washed with methanol and chloroform. The filtrate is extensively concentrated in vacuo at 50° C., benzene is added, and the mixture is extracted three times with 10 cc. of a 1 N-solution of caustic soda and twice with water. The aqueous extracts are extracted once with ether and then combined, and acidified with 5 cc. of glacial acetic acid. 15 minutes later the precipitated crystals are filtered off with suction, washed with water and dried at 60° C. There are obtained 11 milligrams of an acid (Δ⁵-3-ethylenedioxy - 11β,18 - oxido-18-tetrahydropyranyloxy-etienic acid) melting at 228–235° C. with decomposition, which acid is heated at 100° C. for 30 minutes with 1 cc. of glacial acetic acid and 0.2 cc. of water. After cooling the mixture it is diluted, with chloroform, extracted several times with a 2 N-solution of sodium-carbonate, and the aqueous solutions are extracted once with fresh chloroform. The organic solutions are dried and evaporated in vacuo and the residue (9 milligrams) is recrystallized from acetone. The crystallizate so obtained is sublimed at 200–230° C. under 0.02 mm. pressure. By recrystallizing the sublimate from a mixture of methylene chloride, acetone and ether there is obtained a product which, according to the mixed melting point test and infra-red spectrum, is identical with authentic d:l-Δ⁴-3:18-dioxo-11β - hydroxy-etienic acid - (18:11) - cyclo-semi-acetal-(20:18)-lactone.

What is claimed is:

1. Process for the manufacture of 18-substituted 20-oxo-21-hydroxy-pregnane compounds and their derivatives, wherein a 20-oxo-pregnane-21-acid compound of the formula

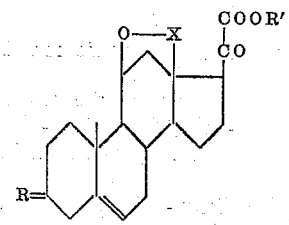

in which R represents a ketalized oxo group, R' a member of the group consisting of a hydrogen atom and a lower alkyl radical, and X a member of the group consisting of the grouping

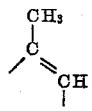

and

Y standing for an etherfied hydroxyl group, is reduced by means of lithium aluminum hydride to form the 20,21-dihydroxy-pregnane, which is then condensed with a reacting derivative of a member selected from the group consisting of an aliphatic, a cycloaliphatic, an aromatic, an araliphatic and a heterocyclic carboxylic acid to form a 20-hydroxy-21-acyloxy-pregnane, and said 20-hydroxy-21-acyloxy pregnane is then oxidized to form a 20-oxo-21-hydroxy-pregnane.

2. A process of claim 1 wherein the 20-oxo-pregnane-21-acid compound contains a carbon-to-carbon double bond in the 16,17-position.

3. Process according to claim 1, wherein the Δ⁵·¹⁸-3-ethylenedioxy-11β-18a-oxido - 18a - methyl-20-oxo-18-homo-14-iso-pregnadiene-21-acid methyl ester is used as starting material.

4. Process according to claim 1, wherein the Δ⁵·¹⁶-3-ethylenedioxy - 11β,18-oxido - 18 - tetrahydropyranyloxy-20-oxo-pregnadiene-21-acid methyl ester is used as starting material.

5. Process according to claim 1, wherein the 20,21-dihydroxy pregnane formed is degraded with periodic acid, the resulting 17-formyl compound oxidized with potassium permanganate in pyridine to form the etio acid.

6. Process according to claim 1, wherein the resulting 20,21-dihydroxypregnane is reacted in the presence of an acid acceptor with 1.0–1.2 molecular equivalent of a reactive derivative of a carboxylic acid, and the resulting 21-monoester is oxidized with chromic acid in pyridine.

7. Process according to claim 6, wherein the 20,21-ketol ester is treated with an acidic hydrolyzing agent to liberate the protected oxo groups in the 3- and 18-positions.

8. A member selected from the group consisting of compounds of the formula

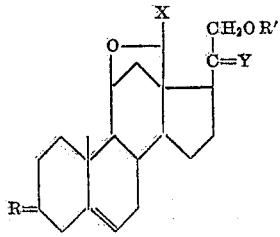

wherein R represents a ketalized oxo group, R' a member selected from the group consisting of a hydrogen atom and an acyl group, X an etherified hydroxyl group and Y stands for a member selected from the group consisting of the

group and O, and said compounds containing a further double bond in 16,17-position.

9. A member selected from the group consisting of $\Delta^5$-3-ethylenedioxy - 11β,18 - oxido - 18 - tetrahydropyranyloxy-20,21-dihydroxy-pregnene and 21-lower alkyl esters thereof.

10. $\Delta^5$-3-ethylenedioxy - 11β,18 - oxido - 18 - tetrahydropyranyloxy-20-hydroxy-21-acetoxy-pregnene.

11. $\Delta^5$-3-ethylenedioxy - 11β,18 - oxido- 18 - tetrahydropyranyloxy-20-oxo-21-acetoxy-pregnene.

12. Compounds of the formula

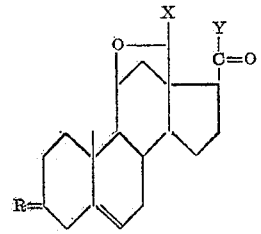

wherein R represents a ketalized oxo group, X an etherified hydroxyl group, and Y stands for a member selected from the group consisting of hydrogen, a hydroxyl and a lower alkoxy group.

13. $\Delta^5$-3-ethylenedioxy - 11β,18 - oxido - 18 - tetrahydropyranyloxy-17β-formyl-androstene.

14. $\Delta^5$-3-ethylenedioxy - 11β,18 - oxido - 18 - tetrahydropyranyloxy-etienic acid.

References Cited in the file of this patent
UNITED STATES PATENTS 2,841,531  Wettstein et al. _____ July 1, 1958
2,862,925  Reichstein et al. _____ Dec. 2, 1958

OTHER REFERENCES

Heusler et al.: Helv. Chim. Acta., vol. 41, No. 4, pages 997–1017 (June 1958).

UNITED STATES PATENT OFFICE
CERTIFICATE OF CORRECTION

Patent No. 3,002,972                                                October 3, 1961

Albert Wettstein et al.

It is hereby certified that error appears in the above numbered patent requiring correction and that the said Letters Patent should read as corrected below.

Column 4, under the formula XVI for

Signed and sealed this 17th day of July 1962.

(SEAL)
Attest:

ERNEST W. SWIDER                                        DAVID L. LADD
Attesting Officer                                         Commissioner of Patents